June 16, 1931. P. A. FRAZIER 1,810,702
IRREGULAR DRIVE MOTION
Filed June 4, 1928   2 Sheets-Sheet 1

Inventor:
Philip A. Frazier,
By Dyrenforth, Lee, Chritton and Wiles,
Attys.

June 16, 1931. P. A. FRAZIER 1,810,702
IRREGULAR DRIVE MOTION
Filed June 4, 1928 2 Sheets-Sheet 2
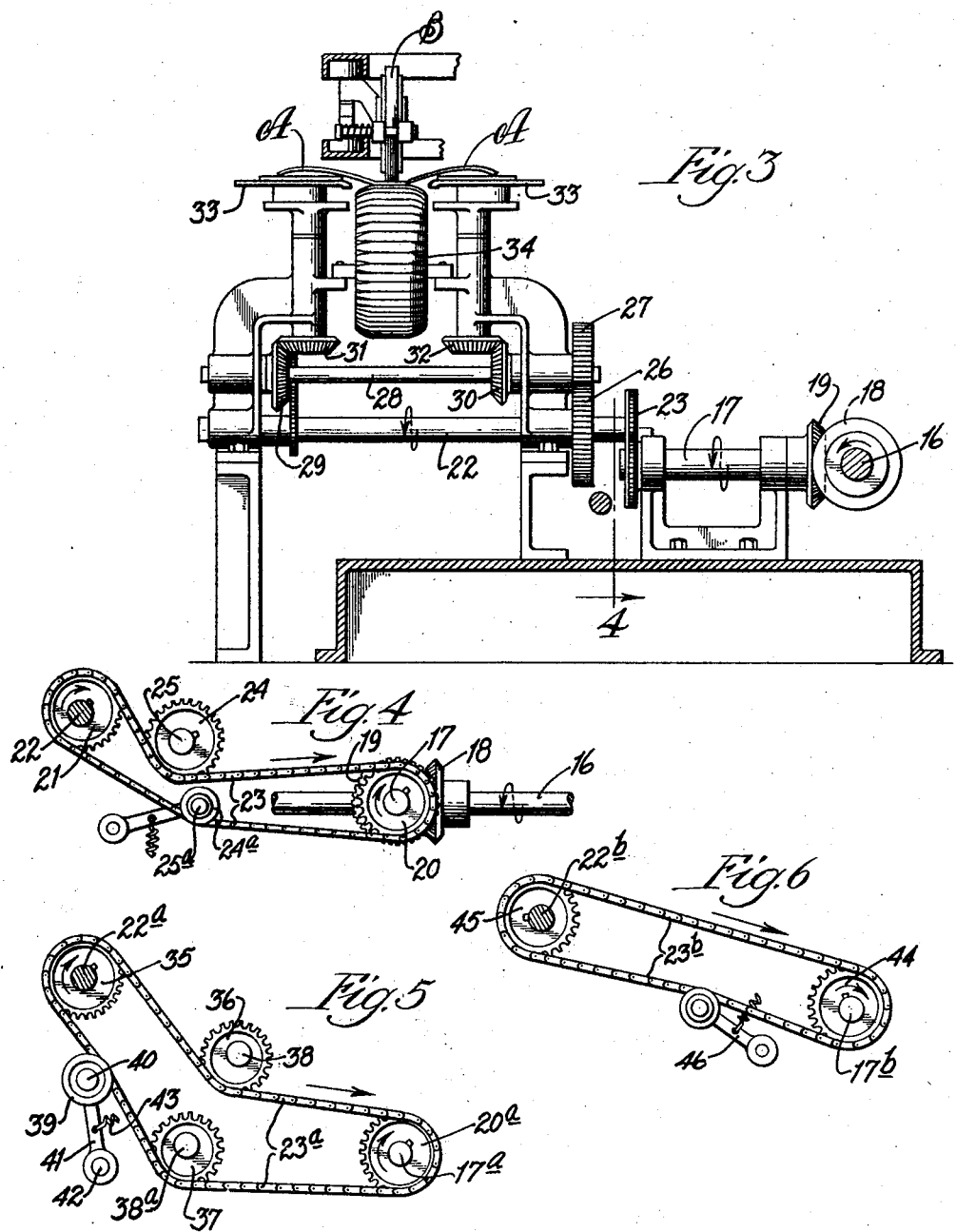
Inventor:
Philip A. Frazier,
By Dyrenforth, Lee, Chritton and Wiles,
Attys.

Patented June 16, 1931

1,810,702

UNITED STATES PATENT OFFICE

PHILIP A. FRAZIER, OF CHICAGO, ILLINOIS, ASSIGNOR TO R. R. DONNELLEY & SONS COMPANY, OF CHICAGO, ILLINOIS, A CORPORATION OF ILLINOIS

IRREGULAR DRIVE MOTION

Application filed June 4, 1928. Serial No. 282,786.

This invention relates to an irregular drive for elements forming part of a book-binding machine of the type in which the books are carried by a continuous chain conveyor. This chain is driven by a large sprocket having a small number of teeth. The difference in the effective radii at different points in the swing cause the chain to move forward with an irregular or pulsating motion when the sprocket is driven at a uniform rate. In a machine of this character, it is sometimes necessary to drive other mechanism which is associated with the chain conveyor so as to perform one or more operations on the books carried by the chain conveyor.

Great difficulty has heretofore been experienced in performing certain operations, such as applying a cover to the book, due to the fact that while the auxiliary mechanism is driven at a uniform rate, the chain conveyor is driven with an irregular or jerky motion, as previously explained. Consequently considerable difficulty has been experienced in obtaining a proper placement of the cover with respect to the book which has previously been glued.

An object of this invention is to provide a means for overcoming this difficulty due to differences in the driven speeds of the chain conveyor and the auxiliary mechanism or mechanisms which may be associated therewith.

This and other objects, as will hereinafter appear, are accomplished by this invention which is fully described in the following specification and shown in the accompanying drawings, in which—

Figure 3 is a view looking in the opposite direction to Fig. 2, showing the cover pressing mechanism;

Figure 4 is a view taken on the line 4 of Fig. 3; and

Figure 1:
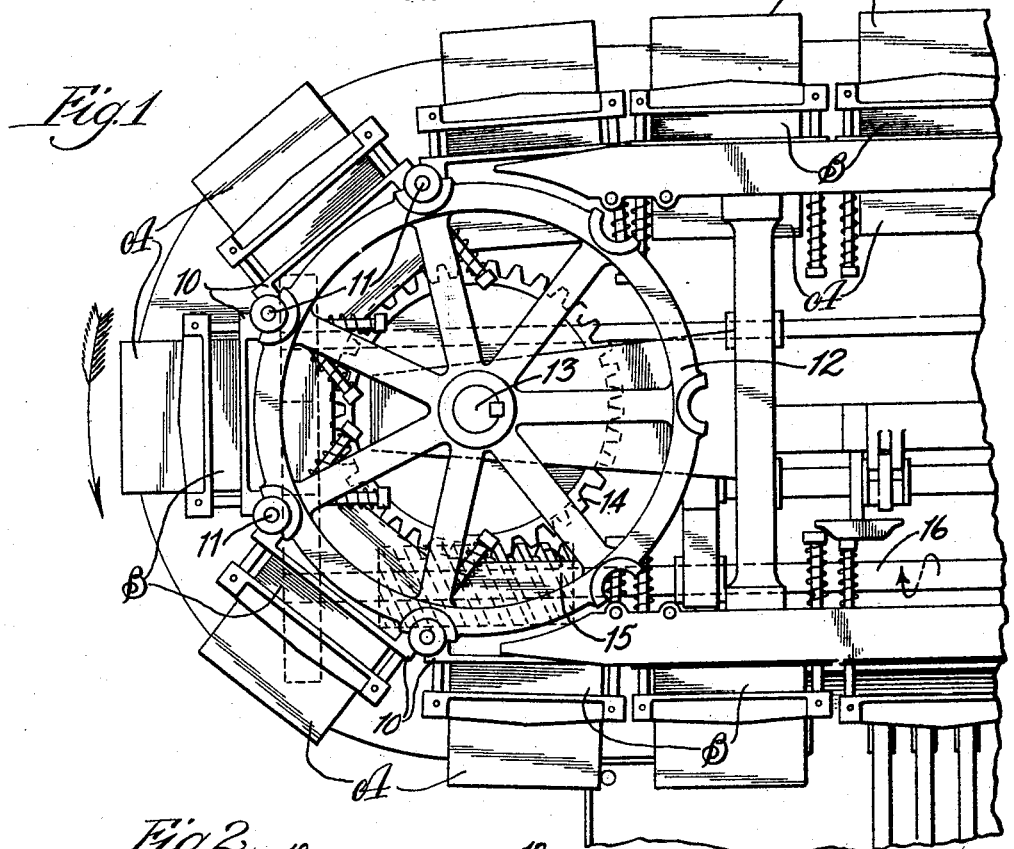
Figure 1 is a partial top plan view of the book-binding machine showing the driving sprocket.
Figure 2:
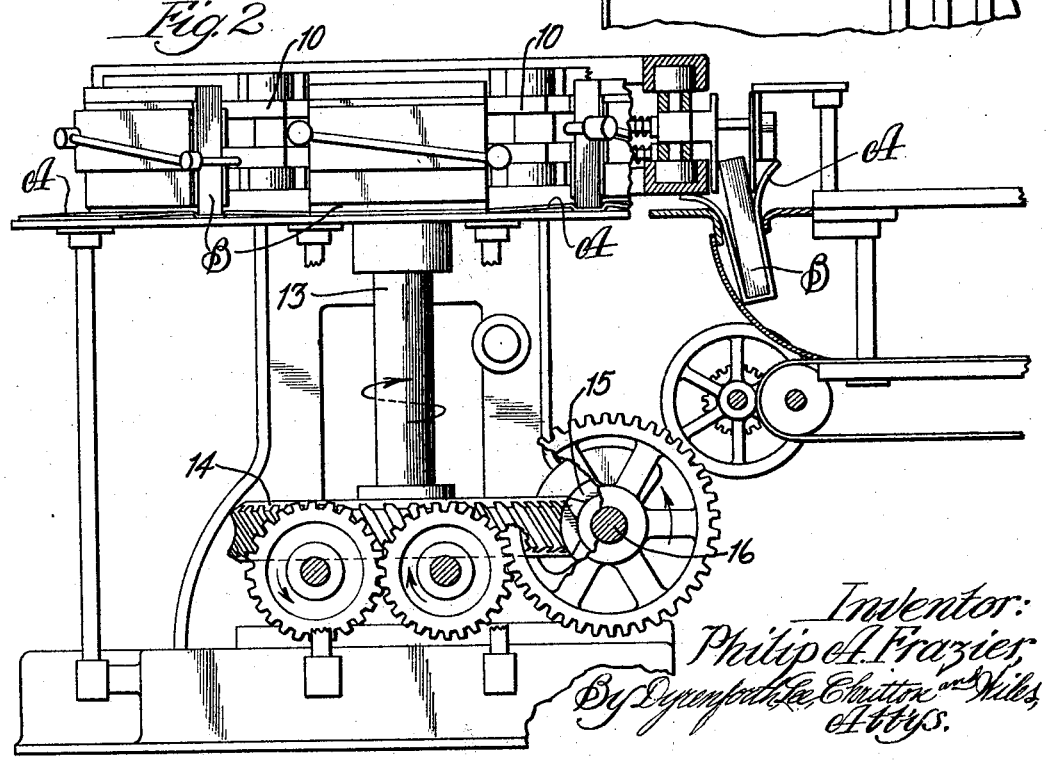
Figure 2 is an end elevation showing some of the parts in section.

Figures 5 and 6, views like Fig. 4, but partly diagrammatic, of modifications of the mechanism of Fig. 4 for producing the desired jerking or irregular motion of the shaft which it is desired be moved in timed relation to the conveyor chain.

The original book-binding machine is fully shown and described in the patent to Bredenberg, No. 1,073,324 dated September 16, 1913, while the cover pressing mechanism shown in Fig. 3 is fully shown and described in applicant's prior Patent No. 1,543,378 of June 23, 1925.

The chain conveyor consisting of a series of links 10 pivotally connected by means of pins 11 is driven by means of a sprocket 12 which is keyed on the vertical shaft 13. This shaft is driven by means of a worm wheel 14 which meshes with a worm 15 on the main drive shaft 16. This shaft is driven at a uniform rate by means of an electric motor or the like, not shown.

Thus it will be seen, that owing to the fact that the sprocket 12 has relatively few teeth, the chain conveyor will be propelled with an irregular or jerky motion.

Referring now to Figs. 3 and 4, the shaft 16 drives the counter shaft 17 by means of bevel gears 18, 19. The shaft 17 in turn has a sprocket 20 keyed thereon and this drives a sprocket 21 which is keyed on the shaft 22 by means of a chain 23. Idler sprocket 24 and a plain surface spring-pressed idler 24ª carried on shafts 25 and 25ª, respectively, ride upon the chain 23. The sprockets 21 and 24 are both made eccentric while the sprocket 20 is of the concentric type. Consequently the regular rotary motion of the shaft 17 is transmitted as an irregular motion to the shaft 22.

The shaft 22 carries a gear 26 which meshes with the gear 27 on the shaft 28. Bevel gears 29 and 30 on the shaft 28 mesh with the bevel gears 31 and 32 on vertical shafts, not shown, which operate certain side pressing mechanisms 33. The patent to Frazier, No. 1,543,378, also shows fully the driving connection between the shaft 22 and the pressure belt 34. This pressure belt is adapted to receive and carry a cover A for the book B which is held by the chain conveyor.

The pressure belt 34 travels forward with the chain conveyor 10 and, because of the irregular drive motion shown in Fig. 4, and which will later be more fully described, the pressure belt 34 is given substantially the same irregular motion as that of the chain conveyor 10, so that when the cover A by the pressure belt 34 is pressed against the back of the glued book B it will be in registration therewith and the two will move forward with substantially the same jerky motion; also the side presses 33 are driven, as previously explained, by the same shaft 22 so that they also are substantially in step with the irregular drive motion of the chain conveyor 10.

With the form here shown, it is necessary that the sprockets 21 and 24 shall make one revolution for each link of the chain 10 as it passes a given point. It is necessary, of course, to chose the eccentricity of these sprockets to suit the particular conditions of the chain conveyor with which they are to be used. This can best be arrived at by experiment. I have found that a machine constructed in accordance with my invention will feed the covers A to the backs of the books B in timed relation to the irregular motion of the books so that there is no danger, as formerly, of slipping the cover on the book, due to the fact that formerly the pressure belt 34 had a tendency to work forward and back with respect to the book B because the book B has a jerky motion, while the pressure belt 34 has a regular, uniform motion.

I have found that in the particular machines of this chain-conveyor type that have come to my notice, the conveyor is caused to jerk or accelerate twice during a distance of travel equal to a length approximating that of each link of the chain and under such conditions it is desired that the eccentrics 21 and 24 be so angularly positioned relative to each other about their axes of rotation, as shown, that the shaft 22 is caused to accelerate or jerk twice during each revolution thereof in substantially timed relation to the accelerating or jerking of the conveyor chain, it being understood, however, that where one acceleration or jerk for each revolution of the shaft 22 is desired this may be effected by changing the angular position of the sprocket 24 or omitting this sprocket and substituting therefor an idler roller.

The pressure belt here illustrated is only one of various things which might be used in connection with the chain conveyor 10.

By preventing slippage between the pressure belt and the chain conveyor a very much thinner glue may be used. Where slippage does occur, a heavy glue is necessary in order to keep the cover from being slipped on the book. The thinner glue makes a much better book because of its better penetrating qualities.

Referring now to the modification shown in Fig. 5 for driving the shaft corresponding with the shaft 22 of Fig. 4 and designated 22$^a$ for causing it to have an irregular or jerky movement, this construction comprises the driving shaft represented at 17$^a$ and corresponding with the shaft 17 of Fig. 4 provided with a concentric sprocket 20$^a$ connected with a concentric sprocket 35 on the shaft 22$^a$, by a sprocket chain 23$^a$. The irregular or jerky motion of the shaft 22$^a$ is produced in this construction by eccentric sprockets 36 and 37 fixed on idler shafts 38 and 38$^a$, respectively, and meshing with the chain 23$^a$, these sprockets being set at different angular positions about their respective axes to produce the desired irregular rotary movement of the shaft 22$^a$. The chain 23$^a$ is shown as engaged by an idler roller 39 journalled at 40 on the outer end of an arm 41 pivotally supported at 42 on a stationary part of the machine and yieldingly pressed toward the chain 23$^a$ by a spring 43 which serves as a take-up for the chain.

In the modified form of construction shown in Fig. 6 the drive shaft corresponding with the shaft 17 of Fig. 4 is represented at 17$^b$ and the shaft to be driven thereby and corresponding with the shaft 22 of Fig. 4 is represented at 22$^b$. In this construction the shafts 17$^b$ and 22$^b$ have rigidly secured thereto eccentric sprockets 44 and 45 engaged by an endless chain represented at 23$^b$, the eccentrics 44 and 45 being set into such angular positions of adjustment about their axes as to produce irregular rotary movement of the shaft 22$^b$.

However, in this particular construction the shaft 22$^b$ will be accelerated or jerked only once during each rotation thereof. A chain tightening device represented at 46 and of the same construction as the chain tightening device of Fig. 5 is provided.

While I have shown and described a plurality of embodiments of my invention, it is to be understood that it is not limited thereto but that it is capable of many other modifications. Changes, therefore, in the constructions and arrangements shown may be made which do not depart from the spirit and scope of the invention which is disclosed in the appended claims.

What I claim as new, and desire to secure by Letters Patent, is:

1. In a machine of the class described, a continuous chain conveyor, means thereon for conveying objects to be operated on, a sprocket for driving the chain conveyor and of such diameter and such few relatively widely spaced apart teeth that said sprocket advances said conveyor with an irregular motion, mechanism comprising an element moving generally in the direction of movement of said conveyor adapted to perform an operation on the object carried by the conveyor, a sprocket driven by the drive for the conveyor sprocket at a uniform rate, and an eccentric sprocket driven by a chain running over the second-mentioned sprocket for driving said element with substantially the same irregular motion as that of the chain conveyor.

2. In a machine of the class described, a continuous chain conveyor, means thereof for conveying objects to be operated on, a sprocket for driving the chain conveyor and of such diameter and such few relatively widely spaced apart teeth that said sprocket advances said conveyor with an irregular motion, mechanism comprising an element moving generally in the direction of movement of said conveyor adapted to perform an operation on the object carried by the conveyor, a sprocket driven by the drive for the conveyor sprocket at a uniform rate, an eccentric sprocket driven by a chain running over the second-mentioned sprocket, and an eccentric idler sprocket running on said chain for imparting to said element an irregular motion similar to that of the chain conveyor.

3. In a machine of the class described, a continuous chain conveyor, means thereon for conveying objects to be operated on, a sprocket for driving the chain conveyor and of such diameter and such few relatively widely spaced apart teeth that said sprocket advances said conveyor with an irregular motion, mechanism comprising an element moving generally in the direction of movement of said conveyor adapted to perform an operation on the object carried by the conveyor, an eccentric sprocket driven by a chain running over the second-mentioned sprocket, and an eccentric idler sprocket running on the tight side of said chain for imparting to said element an irregular motion similar to that of the chain conveyor.

4. In a machine of the class described, an endless chain conveyor, a sprocket wheel driven at a uniform rate and of such diameter and such few relatively widely spaced apart teeth that said sprocket advances said conveyor with an irregular motion, mechanism comprising an element moving generally in the direction of movement of said conveyor and a rotary shaft by which said element is driven to perform an operation on an object while on said conveyor, eccentric gear mechanism operating when driven in step with said sprocket to impart to said rotary shaft and thus to said element an irregular motion and substantially the same as that of said conveyor for given intervals of its travel so that said conveyor and element will advance at substantially the same rate during said given intervals, and means for driving said gear mechanism in step with said sprocket.

5. In a machine of the class described, an endless chain conveyor, a sprocket wheel driven at a uniform rate and of such diameter and such relatively widely spaced apart teeth that said sprocket advances said conveyor with an irregular motion, mechanism comprising an element moving generally in the direction of movement of said conveyor, and a rotary shaft by which said element is driven to perform an operation on an object while on said conveyor, means including an eccentric gear mechanism operating when driven in step with said sprocket to impart to said rotary shaft and thus to said element an irregular motion and substantially the same as that of said conveyor for given intervals of its travel so that said conveyor and element will advance at substantially the same rate during said given intervals, and means for driving said first-named means in step with said sprocket.

6. In combination with an endless conveyor having an irregular motion, a drive member rotatable during motion of said conveyor, mechanism to perform an operation on an object carried by said conveyor, said mechanism having an element movable generally in the direction of movement of said conveyor, a rotatable drive member for said element, and an endless member trained over said drive members, one of said drive members being eccentrically mounted so as to impart the irregular motion of the conveyor to said element.

7. In combination with an endless conveyor having an irregular motion, a drive member rotatable during motion of said conveyor, mechanism to perform an operation on an object carried by said conveyor, said mechanism having an element movable generally in the direction of movement of said conveyor, a rotatable drive member for said element, an idler member, and an endless member trained over said drive members and engaged by said idler member, one of said members being eccentrically mounted to impart the irregular motion of the conveyor to said element.

8. In combination with an endless conveyor having an irregular motion, a drive member rotatable during motion of said conveyor, mechanism to perform an operation on an object carried by said conveyor, said mechanism having an element movable generally in the direction of movement of said conveyor, a rotatable drive member for said element, and an endless member trained over said drive members, each of said drive members being eccentrically mounted to impart the irregular motion of the conveyor to said element.

9. In combination with an endless conveyor having an irregular motion, a drive member rotatable during motion of said conveyor, mechanism to perform an operation on an object carried by said conveyor, said mechanism having an element movable generally in the direction of movement of said conveyor, and a rotatable drive member for said element, said drive members being concentrically mounted, an endless member trained over said drive members, and eccentric idler means engaging said endless member to impart the irregular motion of the conveyor to said element.

10. In mechanism comprising two parallel conveyors and driving means therefor, the first of said conveyors being driven at a substantially uniform speed and the second conveyor driven at the same general speed as said first conveyor but with cyclically repetitive variations therefrom, and corrective means intermediate said first conveyor and its driving means for increasing or decreasing the momentary speed of said first conveyor to cause the latter to travel in approximate detailed synchronism with said second conveyor.

PHILIP A. FRAZIER.